(12) United States Patent
Jin et al.

(10) Patent No.: US 9,115,863 B2
(45) Date of Patent: Aug. 25, 2015

(54) OPTICAL COMPOUND SHEET FOR BACKLIGHT MODULE

(75) Inventors: Qingsong Jin, Shanghai (CN); Qing Wang, Shanghai (CN)

(73) Assignee: CCS(Shanghai) Functional Films Industry Co., Ltd., Shanghai (CN)

( * ) Notice: Subject to any disclaimer, the term of this patent is extended or adjusted under 35 U.S.C. 154(b) by 416 days.

(21) Appl. No.: 13/643,007

(22) PCT Filed: Jul. 2, 2010

(86) PCT No.: PCT/CN2010/074913
§ 371 (c)(1),
(2), (4) Date: Jan. 7, 2013

(87) PCT Pub. No.: WO2011/130951
PCT Pub. Date: Oct. 27, 2011

(65) Prior Publication Data
US 2013/0094220 A1    Apr. 18, 2013

(30) Foreign Application Priority Data
Apr. 23, 2010    (CN) .......................... 2010 1 0160651

(51) Int. Cl.
*B32B 17/06*    (2006.01)
*B32B 5/02*    (2006.01)
(Continued)

(52) U.S. Cl.
CPC . *F21V 5/02* (2013.01); *G02B 5/045* (2013.01); *G02B 6/0051* (2013.01); *G02B 6/0053* (2013.01); *G02B 6/0065* (2013.01)

(58) Field of Classification Search
USPC ......... 428/428, 426, 432, 688, 689, 699, 701, 428/702, 87, 323, 332, 409, 441
See application file for complete search history.

(56) References Cited

U.S. PATENT DOCUMENTS 7,269,328 B2    9/2007  Tang .............................. 385/146
7,638,185 B2 *  12/2009 Chuang et al. ................ 428/220
(Continued)

FOREIGN PATENT DOCUMENTS

CN    101285961    10/2008    .......... G02F 1/13357
CN    101295101    10/2008    .......... G02F 1/13357
(Continued)

OTHER PUBLICATIONS

JP 2008262147 English machine translation.*
(Continued)

*Primary Examiner* — David Sample
*Assistant Examiner* — Lauren Colgan
(74) *Attorney, Agent, or Firm* — Fish & Richardson P.C.

(57) ABSTRACT

An optical compound sheet for a backlight module includes a base layer formed of a transparent material, a plurality of structured patterns formed on the base layer at a predetermined interval, a light-condensing layer which includes a surface coating including nano-particles distributed on the surface of the structured patterns at the thickness of 0.01 μm to 1 μm, and an anti-scratching layer which is coated under the base layer at the thickness of 0.1 μm to 3 μm by using the UV-curable bond containing nano-particles. While improving the anti-scratching performance by using the surface coating and the anti-scratching layer containing the nano-particles, the wet-out and Moire phenomena are greatly reduced by the finely separate coating of the nano-particles, thereby achieving both the light-condensing function and light-diffusing function.

8 Claims, 2 Drawing Sheets

(51) Int. Cl.
*B32B 5/16* (2006.01)
*B32B 5/22* (2006.01)
*F21V 5/02* (2006.01)
*G02B 5/04* (2006.01)
*F21V 8/00* (2006.01)

(56) References Cited

U.S. PATENT DOCUMENTS

| | | | |
|---|---|---|---|
| 7,729,056 B2* | 6/2010 | Hwang et al. | 359/625 |
| 7,862,223 B2* | 1/2011 | Hsu | 362/618 |
| 2004/0233526 A1* | 11/2004 | Kaminsky et al. | 359/452 |
| 2005/0059766 A1* | 3/2005 | Jones et al. | 524/431 |
| 2007/0104961 A1* | 5/2007 | Awaji et al. | 428/423.1 |
| 2007/0121227 A1* | 5/2007 | Wang et al. | 359/831 |
| 2007/0171671 A1* | 7/2007 | Kurokawa et al. | 362/606 |
| 2008/0119583 A1* | 5/2008 | Jones et al. | 522/113 |
| 2008/0144335 A1* | 6/2008 | Liu et al. | 362/620 |
| 2008/0247191 A1* | 10/2008 | Hsu | 362/612 |
| 2010/0085735 A1* | 4/2010 | Kim et al. | 362/97.2 |
| 2010/0103529 A1* | 4/2010 | Nakamura et al. | 359/620 |
| 2010/0110347 A1* | 5/2010 | Kitagawa et al. | 349/96 |
| 2011/0058257 A1* | 3/2011 | Lin et al. | 359/599 |

FOREIGN PATENT DOCUMENTS

| | | | | |
|---|---|---|---|---|
| CN | 201210209 | | 3/2009 | G02B 1/02 |
| CN | 101636670 | | 1/2010 | G02B 5/02 |
| JP | 2008262147 | * | 10/2008 | |
| KR | 100636739 | | 10/2006 | G02B 1/10 |
| KR | 20100026417 | * | 3/2010 | |
| WO | 2007/046649 | | 4/2007 | G02B 1/10 |

OTHER PUBLICATIONS

KR 20100026417 English machine translation.*
International Search Report, International Application No. PCT/CN2010/074913, 4 pages, Jan. 27, 2011.

* cited by examiner

OPTICAL COMPOUND SHEET FOR BACKLIGHT MODULE

CROSS-REFERENCE TO RELATED APPLICATIONS

This application is a national stage application of PCT/CN2010/074913, filed on Jul. 2, 2010, which claims the priority of Chinese patent application No. 201010160651.9, which is entitled as "Optical Compound Sheet for Backlight Module", and filed on Apr. 23, 2010, wherein all contents thereof are incorporated herein by reference.

FIELD OF THE INVENTION

The present invention relates to the field of liquid crystal displays, and more particularly to an optical compound sheet for a backlight module.

BACKGROUND OF THE INVENTION

Generally speaking, backlight modules of various structures are used to improve the brightness of the backside illumination flat-panel displays such as the liquid crystal displays (LCDs) including not only electronic illumination boards, notebook computer displays, word processors, desktop computer displays, television sets, camcorders, but also displays of vehicles and aircrafts. The backlight module is provided with a light source, a light guide plate and a plurality of optical sheets, and light from the light source is emergent to the display after passing through the light guide plate and the plurality of optical sheets.

Recently, optical sheets of various forms are used in the backlight modules in order to improve characteristics of the brightness and the view angle of the image display device like the LCD. Among the above optical sheets, optical sheets of various forms are used to improve the light characteristics, and they are classified into condensing optical sheets and diffusing optical sheets. When the condensing optical sheets are used, the brightness characteristic varies largely with the view angle although the brightness is improved, and the view angle characteristic is degraded. If the diffusing optical sheets are used, the brightness is decreased although the view angle characteristic is improved.

Thus, various researches and developments are made for an optical compound sheet having both the light-condensing function and the light-diffusing function.

FIG. 1 is a schematic diagram of an existing backlight module. As shown in FIG. 1, the backlight module includes a light source 4; a light guiding plate 5 for changing the path of light emergent from the light source 4 to guide the light to a display portion (not shown); a plurality of optical sheets 6, 7, 8 disposed between the light guiding plate 5 and the display portion (not shown) to improve the efficiency of the light emergent from the light guiding plate 5; a reflecting plate 2 disposed below the light guiding plate 5 in order to prevent the light generated by the light source 4 from being exposed to the external; a light source reflecting plate 3; and a modular frame 1 on which the reflecting plate 2, the light source reflecting plate 3, the light guiding plate 5 and the optical sheets 6, 7, 8 are laminated in sequence.

During the manufacturing, the optical sheets 6, 7, 8 may be formed by a diffusion sheet 6, a prism sheet 7 and a protection sheet 8. In order to improve the light condensing efficiency, a structured pattern 9 of the prism sheet 7 has a triangular cross-section, and the shape of a tip of the structured pattern 9 which forms vertex angle is changed variously, wherein the structured pattern 9 having a vertex angle of 90° is acknowledged as providing the best brightness. The function of the diffusion sheet 6 is to diffuse the light emergent from the light guiding plate 5 and incident to the display portion (not shown), so that the brightness distribution of the light becomes uniform.

In order to have both the light-condensing function and the light-diffusing function, the backlight module uses the optical compound sheet to manufacture an integrated optical sheet including minute structured patterns formed on the single base layer and diffusion patterns formed below the base layer.

The optical compound sheet may be disposed on the light guiding plate 5 or attached onto the prism sheet 7 depending on the configuration required by the backlight module.

FIG. 2 is a cross-section diagram of one embodiment of an existing optical compound sheet. Generally, an optical compound sheet 10 includes triangular structured patterns 12 formed on a base layer 11 for light condensation and beads 14 formed below the base layer 11 for light diffusion.

Thus, the beads 14 formed below the base layer 11 have the function of light diffusion before converging external incident light to the triangular structured pattern 12. For example, when the optical compound sheet 10 is applied to the backlight module, light emergent from the light guiding plate 5 is diffused by the beads 14 instead of any other diffusion sheet 6.

The beads 14 may be disposed between the triangular structured pattern 12 and the base layer 11. In addition to the beads 14, micro-particles of 2~5 μm may also additionally be used to realize the diffusing function.

However, the particles of the existing optical compound sheet are larger relative to the structured pattern which usually has a predetermined interval of 50 μm and a height of 25 μm, so it is difficult to uniformly arrange the particles when they are embedded into the structured pattern. In addition, when a structural deformation is tried, the whole brightness of the light passing the optical compound sheet is decreased due to the haze increment and the Total Transmission (TT) loss.

In addition, since a structured pattern layer or the beads have a weak anti-scratching performance, a surface damage will easily occur during the manufacturing, laminated assembly or transportation. Thus, there are many surface flaws and the product yield is low. That is to say, because the micro-particles and the beads below the base layer form protruded structures, in sizes of 2~5 μm, scratches may be easily caused during the assembly and manufacturing of the optical sheets, and a brightness loss of about 2% is resulted due to the defects of the sizes and the protruded structures.

In order to solve such problem, some patents intended to improve the anti-scratching performance have been disclosed.

U.S. Pat. No. 7,269,328 discloses an optical prism film for improving brightness, and the patent forms enhancement layers of different hardness coefficients below the base layer in order to prevent the damage caused by scratches. However, such prior art is only suitable to the common backlight module rather than the optical compound sheet, because both sides of the base layer of the optical compound sheet have functional coatings, the functionality of original coatings will be damaged if the enhancement layers are added.

American patent US2007/0121227A1 discloses a technique using scattering particles of silicon resin inside the structured pattern, in which the scattering particles are distributed in sizes of 0.5-30 μm. Further, in the technique disclosed by Korean patent registered as No. 10-0636739, transparent nano-particles are used in the ultra violet (UV) cured resin layer forming the minute structured pattern, so as to improve the hardness.

However, the above two prior arts are only limited to the optical prism sheet or the diffusion sheet, and they are difficult to be applied to the optical compound sheet having both the light-condensing function and the light-diffusing function. In addition, during the formation of the structured pattern, the surface of the structured pattern may not be smooth due to the existence of internal scattering particles, and the other side of the structure pattern is easier to be scratched and deficient.

SUMMARY OF THE INVENTION

The objective of the present invention is to overcome the deficiencies of the prior art and provide an optical compound sheet for a backlight module, so as to solve the problem in the prior art that the anti-scratching performance of the optical compound sheet is poor and the brightness loss of the transmission light is large.

In order to achieve the above objective, the present invention provides an optical compound sheet for a backlight module, wherein the optical compound sheet comprises a base layer, formed of a transparent material; a plurality of structured patterns, formed on the base layer at a predetermined interval; a light-condensing layer, including a surface coating containing nano-particles distributed on a surface of the structured patterns; and an anti-scratching layer, disposed under the base layer and coated using a Ultraviolet (UV)-curable bond that contains nano-particles.

As another further aspect of the embodiment of the present invention, the bond of the anti-scratching layer and the surface coating contain at least one of the following nano-particles of $SiO_2$, $TiO_2$, $Al_2O_3$ or poly-methyl methacrylate.

As another further aspect of the embodiment of the present invention, the bond comprises a dispersion stabilizer that contains a surfactant.

As another further aspect of the embodiment of the present invention, the surfactant includes cationic, anionic, nonionic or fluorous.

As another further aspect of the embodiment of the present invention, the nano-particles have a particle diameter of 10 to 100 nm, the surface coating has a thickness of 0.01 to 1 μm, and the anti-scratching layer has a thickness of 0.1 to 3 μm.

In addition, the light-condensing layer is formed by UV-radiating and cross-linking a mixture of an acrylate oligomer of 40 to 50 parts by weight, an acrylate monomer of 45 to 55 parts by weight, a photopolymerization initiator of 1 to 5 parts by weight, and an additive of 0.01 to 2 parts by weight.

In addition, the structured patterns of the light-condensing layer are so structured as to have at least one of a cross-section of repetitive triangular cylinders, a cross-section of repetitive triangular pyramids, a cross-section of repetitive semicircular cylinders, a cross-section of repetitive pentagram cylinders, and a cross-section of repetitive trapezoidal cylinders or lenses.

The present invention has a multi-layer structured optical compound sheet coated with nano-particles for a backlight module, and improves the surface strength of the structured pattern of the light-condensing layer via the surface coating containing nano-particles. Meanwhile, the defect of the optical sheet can be concealed through the diffusing function to improve the diffusing and anti-scratching performances below the base layer. In addition, the protrusion structure for diffusion is implemented using the nano-unit coating, thereby reducing the brightness loss of the transmission light, and concealing or counteracting the defects exposed on the structured patterns.

Further, the present invention has the anti-scratching layer containing nano-particles, therefore the anti-scratching performance can be improved and the brightness can be maintained, without employing the protection sheet that shall be provided separately in the existing optical compound sheet. In addition, the wet-out and Moire phenomena are greatly reduced by the finely separate coating of the nano-particles, thereby achieving an optical compound sheet for a backlight module, which has both the light-condensing function and light-diffusing function.

BRIEF DESCRIPTION OF THE DRAWINGS

The drawings described herein provide further understandings of the present invention, and construct a part of the present application rather than limitations to the present invention, in which.

REFERENCE NUMERALS

Figure 1:
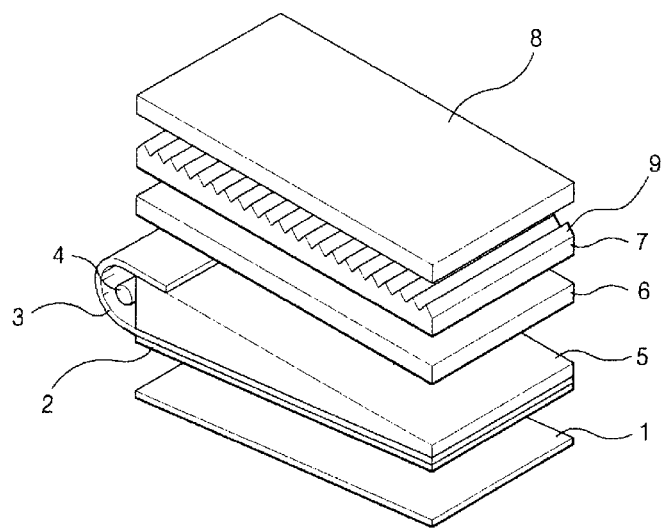
FIG. 1 is a schematic diagram of a backlight module in the prior art.
Figure 2:
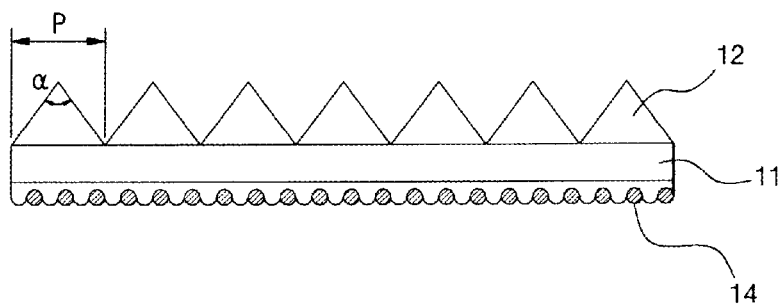
FIG. 2 is a cross-section diagram of an embodiment of an optical compound sheet in the prior art.

1: modular frame
4: light source
3: light source reflecting plate
5: light guiding plate
6: diffusion sheet
20: optical compound sheet
22: light-condensing layer
25: structured patterns
7: prism sheet
21: base layer
23: anti-scratching layer
26: surface coating

DETAILED DESCRIPTION OF THE PREFERRED EMBODIMENTS

In order to make the objective, technical solutions and advantages be clearer, the embodiments of the present invention will be detailedly described as follows with reference to the drawings. Herein the exemplary embodiments of the present invention and the descriptions thereof are just explanations of the present invention rather than limitations to the present invention.

Figure 3:
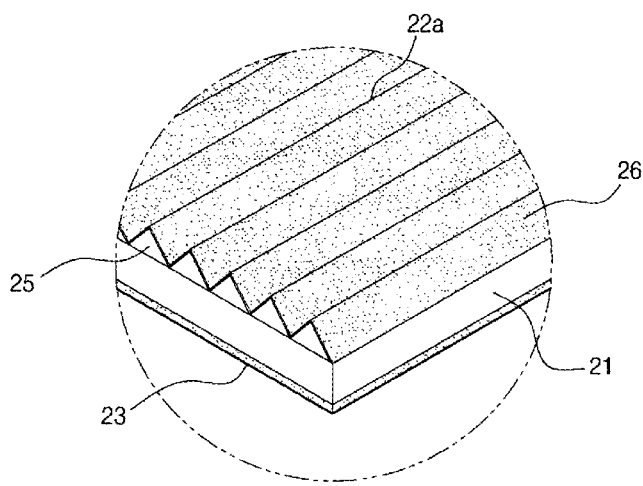
FIG. 3 is a structure diagram of a multi-layer structured optical compound sheet coated with nano-particles for a backlight module according to an embodiment of the present invention.
Figure 4:
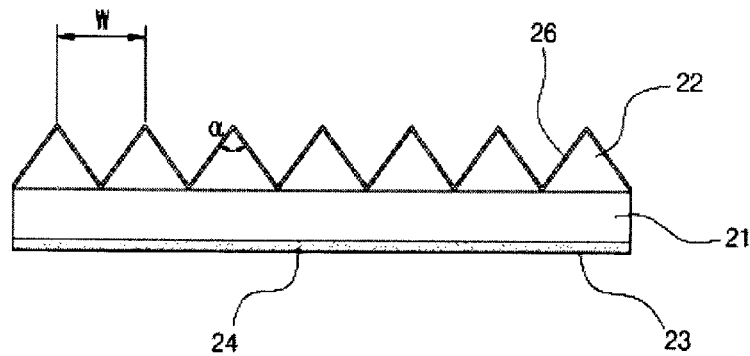
FIG. 4 is a cross-section diagram of the optical compound sheet as shown in FIG. 3.
Figure 5:
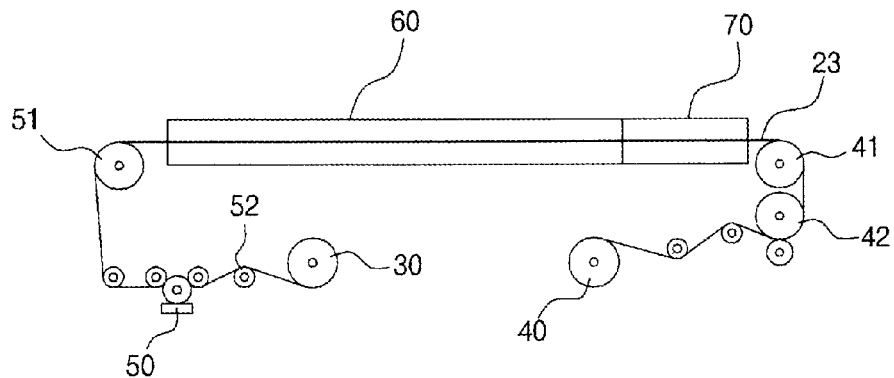
FIG. 5 is a process flow diagram of manufacturing a surface coating and an anti-scratching coating according to an embodiment of the present invention.
Figure 6:
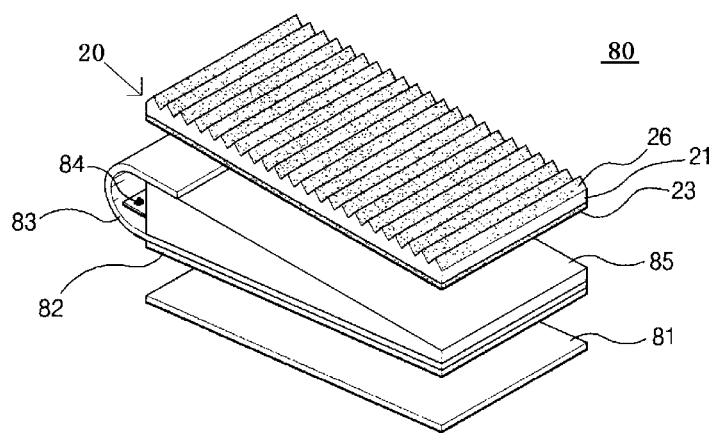
FIG. 6 is a schematic diagram of a backlight module provided with an optical compound sheet according to an embodiment of the present invention.

FIG. 3 is a schematic diagram of an optical compound sheet coated with nano-particles for a backlight module according to an embodiment of the present invention; FIG. 4 is a cross-section diagram of the optical compound sheet as shown in FIG. 3; FIG. 5 is a process flow diagram of manufacturing a surface coating and an anti-scratching layer according to an embodiment of the present invention; and FIG. 6 is a schematic diagram of a backlight module provided with an optical compound sheet according to an embodiment of the present invention.

As shown in FIGS. 3-4, an optical compound sheet 20 of the present invention includes a base layer 21, a light-condensing layer 22, an anti-scratching layer 23 and a surface coating 26 of the light-condensing layer 22.

In the present invention, the light-condensing layer 22 includes a surface coating 26 containing nano-particles and having the thickness of 0.01 μm to 1 μm on the surface of the structured patterns 25.

The surface coating 26 is made of bond resin, e.g., by distributing and containing nano-particles in the UV-curable bond, the nano-particles may be one or more selected from oxides such as $SiO_2$, $TiO_2$, $Al_2O_3$, etc. or PMMA. In order to improve the particle dispersibility, the bond may further include a dispersion stabilizer containing cationic, anionic, nonionic or fluorous surfactant, and preferably, the dispersion stabilizer contains the photopolymerisable initiator.

Since the surface coating 26 has a high hardness, its function is to reduce the scratches between the tip 22a of the structured pattern 25 and other parts.

In addition, light passing through the surface layer 26 is scattered by the nano-particles, thereby concealing or counteracting the dark spots caused by the defects in the surface coating.

The base layer 21 is made of a transparent material, preferably including, but not limited to, a plastic film made of polyethylene terephthalate (PET), polyethylene naphthalate (PEN), polyethylene, polycarbonate, polyester, etc.

For example, the COSMOSHINE film sold by TOYOBO and the LUMILAR film of TORAY in Japan may be used as the base layer 21.

The function of the light-condensing layer 22 is enabling light passing the base layer 21 to be emergent from the front side of a display portion (not shown) laminated thereon. The light-condensing layer 22 is formed on the base layer 21, including a smooth light incident side and a light emergent side formed with patterns.

The light-condensing layer 22 includes structured patterns 25 of a plurality of prisms arranged toward one direction on the base layer 21. The lower sides of the structured patterns 25 construct the light incident side, while the upper sides of the structured patterns 25 construct the light emergent side.

The light-condensing layer 22 may be made of acrylic resin such as poly-methyl methacrylate (PMMA) or PET, and preferably be made by UV-irradiating and cross-link curing a mixture of an acrylate oligomer of 45-55 parts by weight, an acrylate monomer of 40-55 parts by weight, a photopolymerisable initiator of 1-5 parts by weight and an additive of 0.01-2 parts by weight.

Preferably, the mixture forming the light-condensing layer 22 has an acrylate oligomer of 45 parts by weight, an acrylate monomer of 52 parts by weight, a photopolymerisable initiator of 3 parts by weight and an additive of 2 parts by weight. The acrylate oligomer advisably may be urethane acrylate oligomer.

The acrylate monomer plays the role of reactive diluent or cross-linking agent. The photopolymerisable initiator functions initiate after absorbing light-generation groups, and it may be one or more selected from α-hydroxyketone, phenylglyoxylate and α-aminoketone.

Moreover, the additive may be inhibitor for inhibiting polymerization reaction, surface smoothing agent for uniformizing surface, defoamer for inhibiting bubble arising etc.

Herein, the structured patterns 25 of the light-condensing layer 22 include tips 22a having a certain vertex angle (α), and the tips 22a may be arranged at a preset interval (w).

The structured patterns 25 of the light-condensing layer 22 of the optical compound sheet 20 may be so structured as to have at least one of a cross-section of repetitive triangular cylinders, a cross-section of repetitive triangular pyramids, a cross-section of repetitive semicircular cylinders, a cross-section of repetitive pentagram cylinders, and a cross-section of repetitive trapezoidal cylinders or lenses.

In the present invention, an anti-scratching layer 23 is formed on the other side of the structured pattern 25, i.e., below the base layer 22, and coated with UV-curable bond containing 10-100 nm nano-particles 24 to have a thickness of 0.1-3 μm. In which, if the sizes of the nano-particles exceed the above range, the brightness will be decreased because shielding of the light is weakened due to the influence of the short wavelength, while if the sizes are below the range, a problem of aggregation will occur due to rising of energy at the surface of the nano-particles 22b.

The above nano-particles may be selected from oxides such as $SiO_2$, $TiO_2$, $Al_2O_3$, etc. or PMMA.

The anti-scratching layer 23 has a higher hardness than the prior art, thereby not only being capable of anti-scratching, but also can scatter light incident from the external by means of the nano-particles included therein.

The bond resin forming the anti-scratching layer 23 may be one selected from polycarbonate (PC), PET, polyacrylate (PAR), urethaneacrylate, polyetherimide (PEI), polyethyelenennapthalate (PEN), polyphenylenesulfide (PPS), polyarylate or polyimide, and preferably, made of urethaneacrylate.

In addition, during manufacturing of the optical compound sheet 20 for the backlight module of the present invention, if the anti-scratching layer 23 is formed below the base layer 21, preferably the anti-scratching layer 23 containing nano-particles may be manufactured before the prism formation, and the solvent in the bond containing nano-particles shall be dried and evaporated.

The surface coating 26 would better be manufactured after the prism formation, and the solvent in the bond containing nano-particles shall be dried and evaporated.

As shown in FIG. 5, an apparatus for manufacturing the anti-scratching layer of the optical compound sheet 20 of the present invention includes: a stretching roller 30, a winding roller 40, a plurality of transferring rollers 41, 42, 51, 52, a nano-coating module 50, a drying module 60 and an UV curing module 70. The stretching roller 30 stretches the base layer 21, and the winding roller 40 winds the base layer 21 coated with the anti-scratching layer 23. The plurality of transferring rollers 41, 42 transfer optical thin-film materials having the anti-scratching layer 23 cured by the drying module 60 and the UV curing module 70.

The nano-coating module 50 includes an bond of a mixed volatile solvent containing nano-particles such as $SiO_2$, $TiO_2$, $Al_2O_3$. The above solvent includes not only alcohols such as methanol, ethanol, n-propanol, ISO propanol and n-butanol, but also ketone such as Methyl Ethyl Keton and Methyl Isobutyl Ketone (MIBK).

Moreover, in order to improve dispersibility of the nano-particle, the bond may further include a dispersion stabilizer containing cationic, anionic, nonionic or fluorous surfactant, and preferably, the dispersion stabilizer contains photopolymerisable initiator.

After being coated by the nano-coating module 50, the anti-scratching layer 23 is dried by the drying module 60, cured by the UV curing module 70, and winded by the winding roller 40 for storage.

The optical thin-film material is manufactured using the surface coating 26 through the nano-coating module 50, the drying module 60 and the UV curing module 70.

In the present invention, the method for coating required nano-particle dispersion stabilizer on the surface coating 26 and the anti-scratching layer 23 is not particularly limited, so long as it achieves a uniform coating. Thus various coating methods may be employed, such as the common gravure coating method, wiredrawing coating method, spraying method, micro-gravure coating method and slot die coating method. In addition, other coating methods such as ink-jetting method and screen printing method may also be adopted according to the requirement.

Further, although not shown in the drawings, the methods for manufacturing the structured pattern 25 and the light-condensing layer 22 after the anti-scratching layer 23 is coated below the base layer 21 are the same as those described in the prior art, and herein are omitted.

Next, a backlight module provided with a multi-layer structured optical compound sheet containing coated nano-particles according to an embodiment of the present invention is described with reference to FIG. 6.

A backlight module 80 according to an embodiment of the present invention includes an optical compound sheet 20. The backlight module further includes: a light source 84 disposed adjacent to a light source reflecting plate 83 and providing white light via LEDs; a light guiding plate 85 for guiding light emergent from the light source 84; a reflecting plate 82 disposed below the light guiding plate 85 to prevent light generated by the light source 84 from the outside; and the optical compound sheet 20 for diffusing and focusing light emergent from the above of the light guiding plate 85. The optical compound sheet 20 includes a base layer 21, a light-condensing layer 22, an anti-scratching layer 23, a surface coating 26 and structured patterns 25 (not shown).

The surface coating 26 has a thickness of 0.01 μm to 1 μm on the surface of the structured pattern 25, while the anti-scratching layer 23 has a thickness of 0.1 μm to 3 μm and it is made of UV-curable bond containing nano-particles of size of 10 nm to 100 nm. If the thickness of the anti-scratching layer 23 exceeds the above range, the brightness will be decreased and the display device cannot be light and thin. If the thickness is below the range, the anti-scratching effect of the anti-scratching layer 23 will be poor.

In the backlight module 80 according to an embodiment of the present invention, white light generated by the LED lamp is incident to the anti-scratching layer 23 through the light guiding plate 85, diffused by the nano-particles of the anti-scratching layer 23, focused to the structured pattern 25, and diffused again by the surface coating 26 of the structured pattern to achieve light condensation and diffusion at the same time.

According to an embodiment of the present invention, due to the existence of the anti-scratching layer 23 formed below the base layer 21, the protection sheet that shall be provided separately in the past for preventing foreign materials and scratches now can be removed.

In conclusion, the present invention improves the surface strength of the structured pattern of the light-condensing layer via the surface coating containing nano-particles. Meanwhile, the defect of the optical sheet can be concealed by the diffusing function of the nano-particles. The surface coating of the structured pattern may avoid the insufficient transmittance of the structured pattern caused by the introduction of the micro particles into the structured pattern in the prior art.

Further, the present invention has the anti-scratching layer made of nano-particles, therefore the anti-scratching performance can be improved and the brightness can be maintained, without employing the protection sheet that shall be provided separately in the existing optical compound sheet. In addition, the wet-out and Moire phenomena are greatly reduced by the finely separate coating of the nano-particles.

In the above embodiments, the objective, technical solutions and beneficial effects of the present invention are further described in details. It shall be appreciated that the above descriptions are just embodiments of the present invention rather than limitations to the protection scope of the present invention, and any modification, equivalent replacement, improvement, etc. made without deviating from the spirit and rule of the present invention shall be covered by the protection scope of the present invention.

What is claimed is:

1. An optical compound sheet for a backlight module, wherein the optical compound sheet comprises a base layer, formed of a transparent material; a 5 light-condensing layer, including a plurality of structured patterns formed on the base layer at a predetermined interval, and a surface coating containing nano-particles distributed on a surface of the structured patterns, the surface coating is obtained by distributing and containing nano-particles in a Ultraviolet (UV)-curable bond; and an anti-scratching layer, disposed under the base layer and coated using a UV-curable bond that contains nano-particles, the nano-particles having a particle diameter of 10 to 100 nm.

2. The optical compound sheet for a backlight module according to claim 1, wherein the bond of the anti-scratching layer and the surface coating contain at least one of the following nano-particles of $SiO_2$, $TiO_2$, $Al_2O_3$ or poly-methyl methacrylate.

3. The optical compound sheet for a backlight module according to claim 2, wherein the bond comprises a dispersion stabilizer that contains a surfactant.

4. The optical compound sheet for a backlight module according to claim 3, wherein the surfactant is cationic, anionic, nonionic or fluorous.

5. The optical compound sheet for a backlight module according to claim 3, wherein the bond comprises at least one selected from polycarbonate, polyethylene terephthalate, polyacrylate, urethaneacrylate, polyetherimide, polyethylenenaphthalate, polyphenylene sulfide, polyarylate, or polyimide.

6. The optical compound sheet for a backlight module according to claim 1, wherein the surface coating has a thickness of 0.01 to 1 μm.

7. The optical compound sheet for a backlight module according to claim 1, wherein the anti-scratching layer has a thickness of 0.1 to 3 μm.

8. The optical compound sheet for a backlight module according to claim 1, wherein the light-condensing layer is formed by UV-radiating and cross-linking a mixture of an acrylate oligomer of 40 to 50 parts by weight, an acrylate monomer of 45 to 55 parts by weight, a photopolymerization initiator of 1 to 5 parts by weight, 1o and an additive of 0.01 to 2 parts by weight.

* * * * *

UNITED STATES PATENT AND TRADEMARK OFFICE
CERTIFICATE OF CORRECTION

Page 1 of 1

PATENT NO.       : 9,115,863 B2
APPLICATION NO.  : 13/643007
DATED            : August 25, 2015
INVENTOR(S)      : Jin et al.

It is certified that error appears in the above-identified patent and that said Letters Patent is hereby corrected as shown below:

Claims

Col. 8, line 61, claim 8, delete "1o and" and insert -- and --, therefor.

Signed and Sealed this
Twelfth Day of January, 2016

Michelle K. Lee
*Director of the United States Patent and Trademark Office*